(12) United States Patent
Boss et al.

(10) Patent No.: US 7,519,672 B2
(45) Date of Patent: Apr. 14, 2009

(54) ACTIVE SESSION QUEUE MANAGEMENT USING CONTEXTUAL SYSTEMS WITH AN INSTANT MESSAGING PROXY SERVICE

(75) Inventors: Gregory Jensen Boss, American Fort, UT (US); Yen-Fu Chen, Austin, TX (US); Rick Allen Hamilton, II, Charlottesville, VA (US); Aroopratan D. Pandya, Hopewell Jct., NY (US); James Wesley Seaman, Falls Church, VA (US); Timothy Moffett Waters, Hiram, GA (US)

(73) Assignee: International Business Machines Corporation, Armonk, NY (US)

( * ) Notice: Subject to any disclaimer, the term of this patent is extended or adjusted under 35 U.S.C. 154(b) by 810 days.

(21) Appl. No.: 11/181,418

(22) Filed: Jul. 14, 2005

(65) Prior Publication Data

US 2007/0016643 A1    Jan. 18, 2007

(51) Int. Cl.
*G06F 15/16* (2006.01)
(52) U.S. Cl. ........................ 709/206; 709/203; 705/52; 705/53
(58) Field of Classification Search ................. 709/203, 709/206; 705/52, 53
See application file for complete search history.

(56) References Cited

U.S. PATENT DOCUMENTS

| | | | |
|---|---|---|---|
| 6,434,223 B2 | 8/2002 | Katz | 379/93.13 |
| 6,735,295 B1 | 5/2004 | Brennan et al. | 379/215.01 |
| 6,760,580 B2 | 7/2004 | Robinson et al. | 455/412.2 |
| 7,093,025 B1* | 8/2006 | Gupta | 709/239 |
| 7,133,506 B1* | 11/2006 | Smith | 379/88.25 |
| 2002/0147609 A1* | 10/2002 | McGwin, Jr. | 705/1 |
| 2002/0156738 A1* | 10/2002 | Irmler | 705/52 |
| 2002/0198946 A1 | 12/2002 | Wang et al. | 709/206 |
| 2004/0133638 A1 | 7/2004 | Doss | 709/203 |
| 2004/0154022 A1 | 8/2004 | Boss | 719/310 |
| 2004/0158631 A1 | 8/2004 | Chang et al. | 709/224 |
| 2004/0186766 A1 | 9/2004 | Fellenstein et al. | 705/14 |
| 2004/0203659 A1 | 10/2004 | Mikan | 455/414.1 |
| 2006/0052921 A1* | 3/2006 | Bodin et al. | 701/33 |
| 2006/0168049 A1* | 7/2006 | Orozco et al. | 709/206 |
| 2007/0143159 A1* | 6/2007 | Dillard et al. | 705/7 |

\* cited by examiner

*Primary Examiner*—Kenny S Lin
*Assistant Examiner*—Duyen Doan
(74) *Attorney, Agent, or Firm*—Robert H. Frantz; David A. Mims, Jr.; Libby Z. Handelsman

(57) ABSTRACT

A system and method for providing implementing proxy handling of instant messages and the like, wherein proxy recipients are designated by an original recipient, and one or more redirection rules are established indicating conditions under which said designated proxy recipients are to be sent redirected messages. When an instant message is received directed towards the original recipient, the redirection rules are evaluated and the message is redirect to a designated proxy recipient according to the redirection rules, with the display of the received message being suppressed or blocked on the intended original recipient's user interface.

1 Claim, 11 Drawing Sheets

ACTIVE SESSION QUEUE MANAGEMENT USING CONTEXTUAL SYSTEMS WITH AN INSTANT MESSAGING PROXY SERVICE

CROSS-REFERENCE TO RELATED APPLICATIONS (CLAIMING BENEFIT UNDER 35 U.S.C. 120)

None.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

None.

BACKGROUND OF THE INVENTION

1. Field of the Invention

This invention relates to tools and mechanisms for intelligently handling instant messages directed to users who are temporarily indisposed or unable to review and respond to messages received in real time.

2. Background of the Invention

Instant Messaging ("IM") tools such as IBM's Sametime, MSN Messenger, and Yahoo/AOL Instant Messenger are widely used in workplaces and personal settings to improve communication. Instant Messaging is becoming crucial in day-to-day business life.

According to recent Media Matrix research, AOL Instant Messenger™ has 21.5 Million users, Microsoft Network ("MSN") has 10.3 Million users, and Yahoo!™ has 10.6 Million users of their IM Clients. Additionally, many corporations have integrated instant messaging applications into their suite of productivity tools for their employees. As an example, IBM has deployed Lotus Sametime instant messaging for employees worldwide. This widespread usage demonstrates that instant messaging applications are becoming a major means of communication for both casual and business users. Many users prefer to contact their peers via Instant Messaging as a first choice because it is a fast and efficient method of communication.

As such, IM has become a simple method to connect people together and is especially useful when a user wants to send a short message or ask a quick question, rather than sending a lengthier email, or placing the traditional telephone call. IM enables a quicker response, a convenient communication and interaction over the network, and provides cost-saving.

IM Disruptions to Other Tasks and Trains of Thought

This "real-time" method of communication, however, can also be disruptive at times. If a particular user is in a messaging session with other users, discussing a business opportunity for example, and others outside of the discussion are also sending unrelated messages to one or more of the group of users, some may become distracted by the unrelated messages and lose their train of thought. Additionally, it is possible for such a user to become overwhelmed if many other users are sending instant messages at the same time.

Today's instant messaging clients provide minimal configuration and control for the user. Some manual controls exist, which the user can set once the application is started, such as "block user John Doe" from contacting me. Even considering the manual blocking methods, generally speaking, an on-line instant messaging user is globally available to some subset of all other on-line users.

Current contact management methods would require the user to manually add another user to, and remove that user from the "permitted contact" list each time a change in peer groups is desired.

This is inefficient and impractical when applied during moderate to heavy usage, and is compounded if the user has a large community with which he or she instant messages.

Some existing IM technologies include the ability to define a queue of incoming instant messages, and to control that queue via policies, so that, for instance, no more than 5 active sessions can be presented simultaneously to the end user, with the ability to manually change the queue priority of individuals.

Other existing technologies include the ability to filter incoming messages based on the subject(s) contained within the message and the correlation with the recipient's current context.

These two existing capabilities are also somewhat impractical or cumbersome to use, as the first requires definition and management of the queue policies, and the second requires definition and management of the filters. A need, then, arises for a system and method for user control of how and when an instant messaging user can be contacted via the instant messaging application.

IM User Status Limitations

IM tools currently offered by the various suppliers have functionality available in the tool that allows users to manually setup their own availability status while online, such as "Busy", "Away", "Be Right Back", or even enter their own customized away message. However, besides the inconvenience of having to self-initiate the "away" status, users frequently encounter the problem of long delay in response because the receiver is busy and/or did not notice the IM windows pop-up.

This problem occurs in many face-to-face meetings and also during teleconferences where the receiver is also the moderator or facilitator of the call, and when the "sender" attempts to get the receiver's/moderator's attention by sending an important message using IM.

In addition, there is an intelligence deficiency within the tool itself to automatically set its own availability status and have any astuteness in a user's actual current status. Moreover, if a user is off-line, any message sent to the user during this off-line time period is not captured, nor is the user made aware of these missed message when the user returns online. Therefore, additional needs arise in the art to address these deficiencies, as well.

SUMMARY OF THE INVENTION

The present invention addresses the aforementioned problems in the, and provides additional benefits to instant messaging users as will be apparent in the following detailed description of the invention.

According to a first aspect of the present invention, a method and system of enabling proxy service in IM tools so IM users can identify designees for redirecting the chat message is provided to the users of instant messaging services.

According to another aspect of the present invention, an automatic response mechanism that informs sender the current status of the receiver and prompts sender for redirection in a very intuitive way is provided. These two aspects, taken alone or in combination, allow the IM users to better manager chat sessions and avoids any delays.

Further according to other aspects of the present invention, multiple techniques and processes for providing an instant messaging proxy service which allows a designee to handle incoming messages for either a set or indefinite period of time are disclosed. The invention is capable of using content/context to identify the appropriate proxy, and to automatically take action and manage a queue of missed or redirected messages.

BRIEF DESCRIPTION OF THE DRAWINGS

The following detailed description when taken in conjunction with the figures presented herein provide a complete disclosure of the invention.

DESCRIPTION OF THE INVENTION

Figure 1:
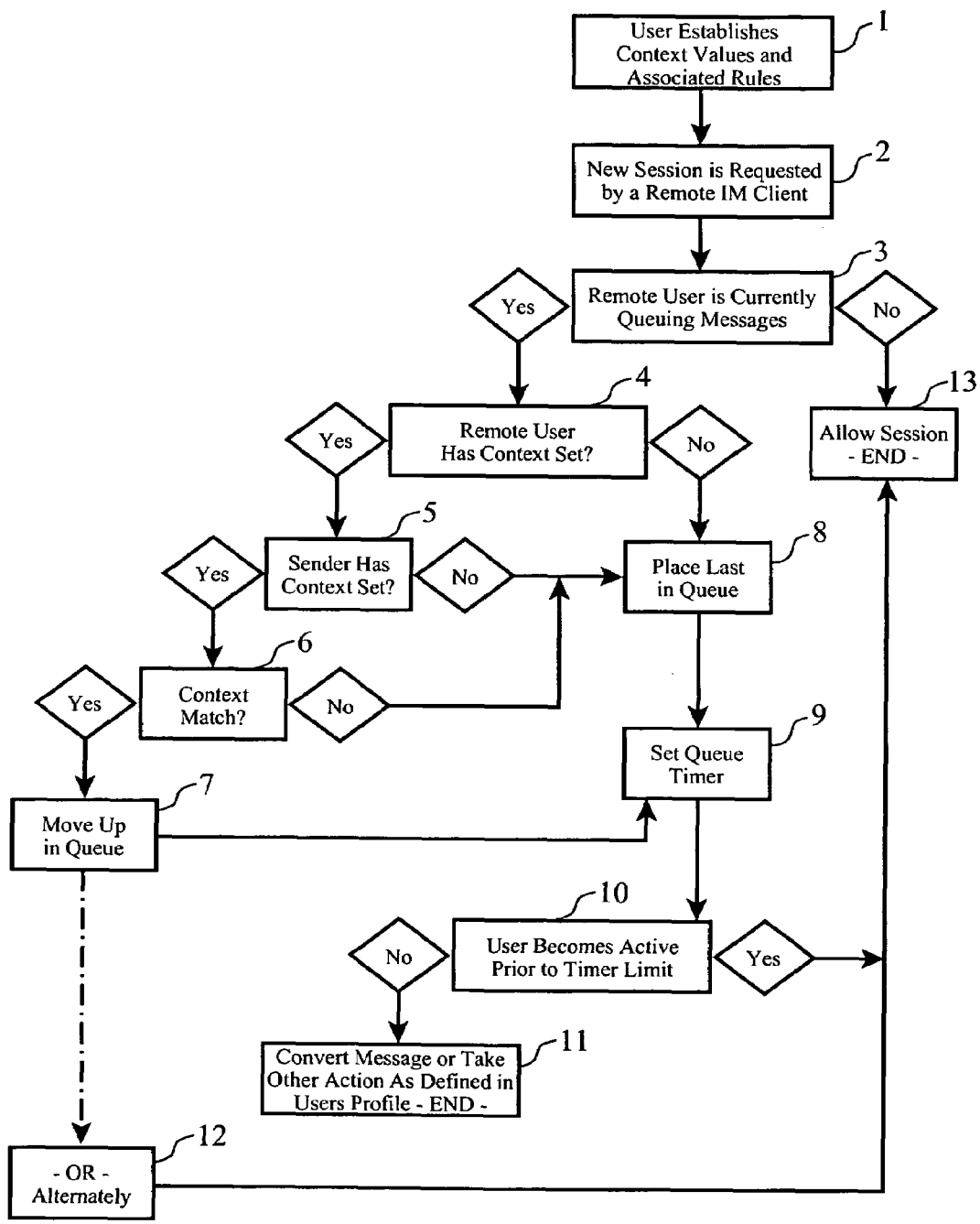
FIG. 1 illustrates a logical process according to the invention.

The following paragraphs will set forth in detail at least one available embodiment of the present invention in order to illustrate the invention. It will be recognized by those skilled in the art that the example(s) set forth do not represent the full scope of the invention, but that many alternate embodiments and design choices may be made without departing from the scope of the invention. Additionally, within the scope of the invention are implementations of one or more cooperating devices, especially computing devices, as well as methods of performing the logical processes of the invention, providing the invention to one or more users, installing the invention, and managing and maintaining the invention.

Redirection and Notification of IM Senders

Currently available technology allows a\moderator, such as a project manager, to hold a conference call for a group of team members, perhaps 20 or more members, with video conferencing. In this example, before the meeting begins, each member receives meeting information such as dial-in number, web address to download presentation files to review, or actual meeting location.

As the meeting is being conducted, if there are any problems with the files or video conferencing connection, it is often difficult for participants to contact the initiator during the meeting. Often, the initiator is tied up on the phone, talking to someone in the office/conference room, or may sometimes disable IM to avoid interference. Therefore, the problems either do not get to the moderator until after the meeting is finished, or the problems are announced directly to everyone on the call, creating even more disruption.

This results in frustration of many of the conferees, and eventual learned avoidance or reluctance to rely upon conferencing technologies in the future. Additionally, the missed communications may have had a significant impact to the flow of the discussion, and may, if entered into the discussion flow, have affected any final decisions made.

The present invention creates an instant messaging proxy service ("IMPS") which allows a user's designee to handle incoming Instant Messages for either a set period of time, or indefinitely. The user that needs to receive but not be distracted by incoming messages can designate an alternate user to receive his or her incoming messages. In this manner, the alternate user can read, response, and prioritize the messages to determine if the originally intended recipient should be interrupted by consideration of the subject of a particular message.

This allows the presenter or facilitator, as in our previous example, to designate a proxy person, such as an assistant or other team member, to whom incoming messages are to be redirected. This allows time-critical messages to be handled immediately by another individual, rather than either ignoring the messages or being interrupted by all of them (the "all or nothing" proposition).

Implementations of the present invention can be done at various levels. For example, the initiator can select all issue-critical messages to be redirected to another team member, designee, who will be in charge of resolving issues during the meeting. This provides support for problem-resolution and ensures that the meeting is not interrupted by administration activities.

Alternately, the initiator can enable an informational message reply facility to automatically reply to each message sender with a certain, pre-defined message, such as "Project Manager John is not available right now, but messages are being redirected to Team Member Amy to resolve immediately."

Other rules and guidelines can be implemented to allow these tools to have a more intelligent response system. For example, if the user has defined several groups of "buddies" or potential senders of messages, a rule can be defined that sends different messages to senders based upon the group(s) to which they belong. A rule may also specify a time period, for example a start time and end time, so that the user does not have to remember to specifically enable or disable the redirection proxy service.

Figure 6A:
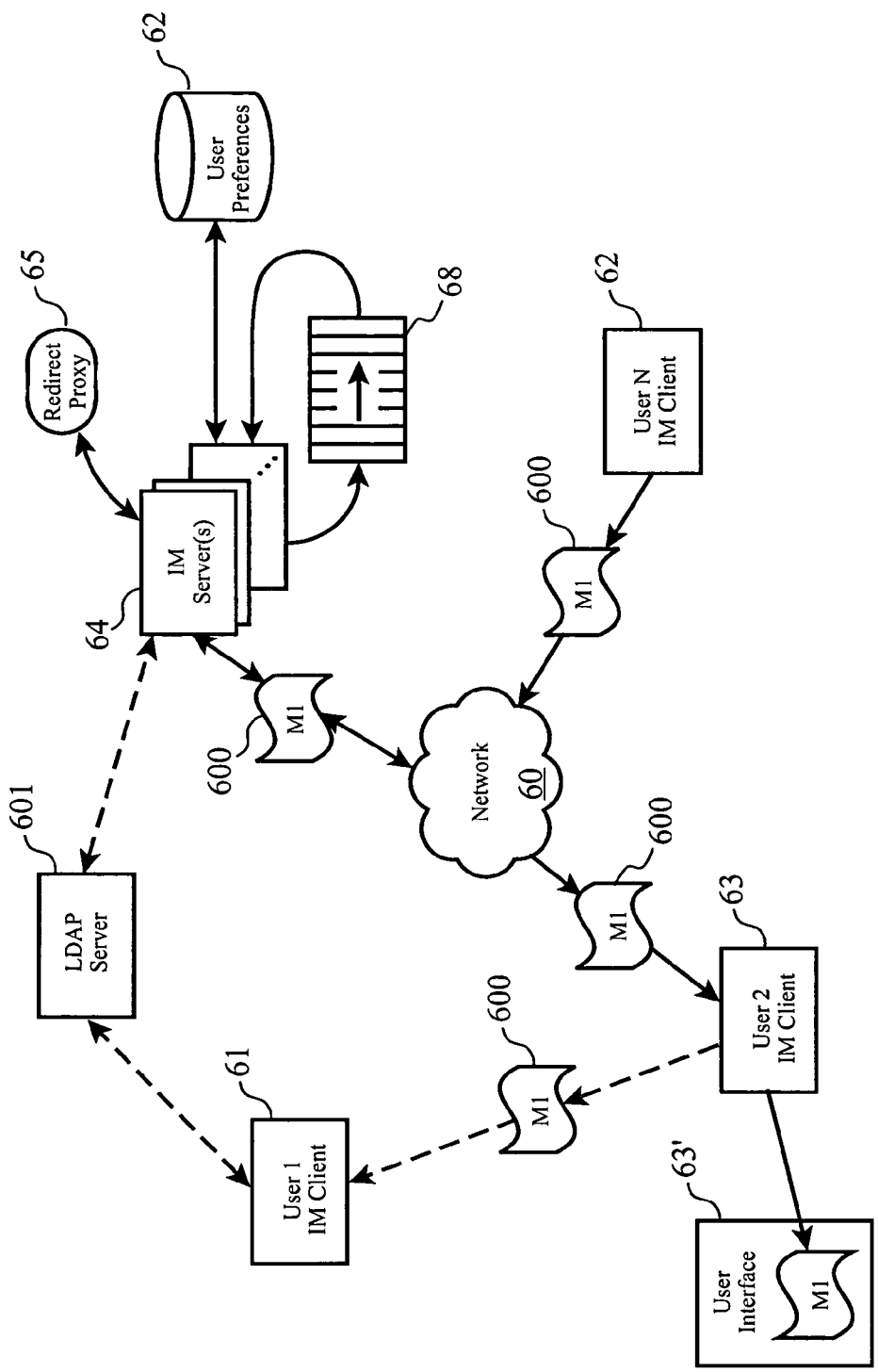
FIG. 6a shows an organization of components and functions to implement the present invention.

Turning to FIG. 6a, an organization of components and functions are shown to implement the present invention, including a computer or communications network (60), such as but not limited to the Internet, and three or more IM client devices (61, 62, and 63), such as but not limited to the mobile telephones, personal computers, and personal digital assistants. The IM client devices are provided with a user interface (not shown for 61 and 62, but shown as 63' for 63) for displaying or audibly playing an IM message (600).

An IM message (600) addressed to an originally intended recipient (61) is sent by a sender (62) via the network (60) to an IM server (64) or group of servers, which determines if the originally intended recipient (61) is on-line, off-line, or if a proxy recipient (63) has been designated by the intended-receiver user (61). If the latter is true, the IM servers (64) do not pass the message (600) to the originally intended recipient (61), but instead a redirection proxy service (65) forward the message (600) to the designated proxy user (63), where it is received and displayed or played on the user interface (63'). Optionally, if the designated proxy user determines that the message needs to be seen or heard by the originally intended recipient, he or she may forward the message (600) appropriately. Redirected messages, and optionally replies to those redirected messages, may optionally be stored in a message queue (68) for later access by the originally intended user (61). Integration to an LDAP server (601), as explained in the following paragraphs, can optionally provide enhanced service to the users.

Figure 6B:
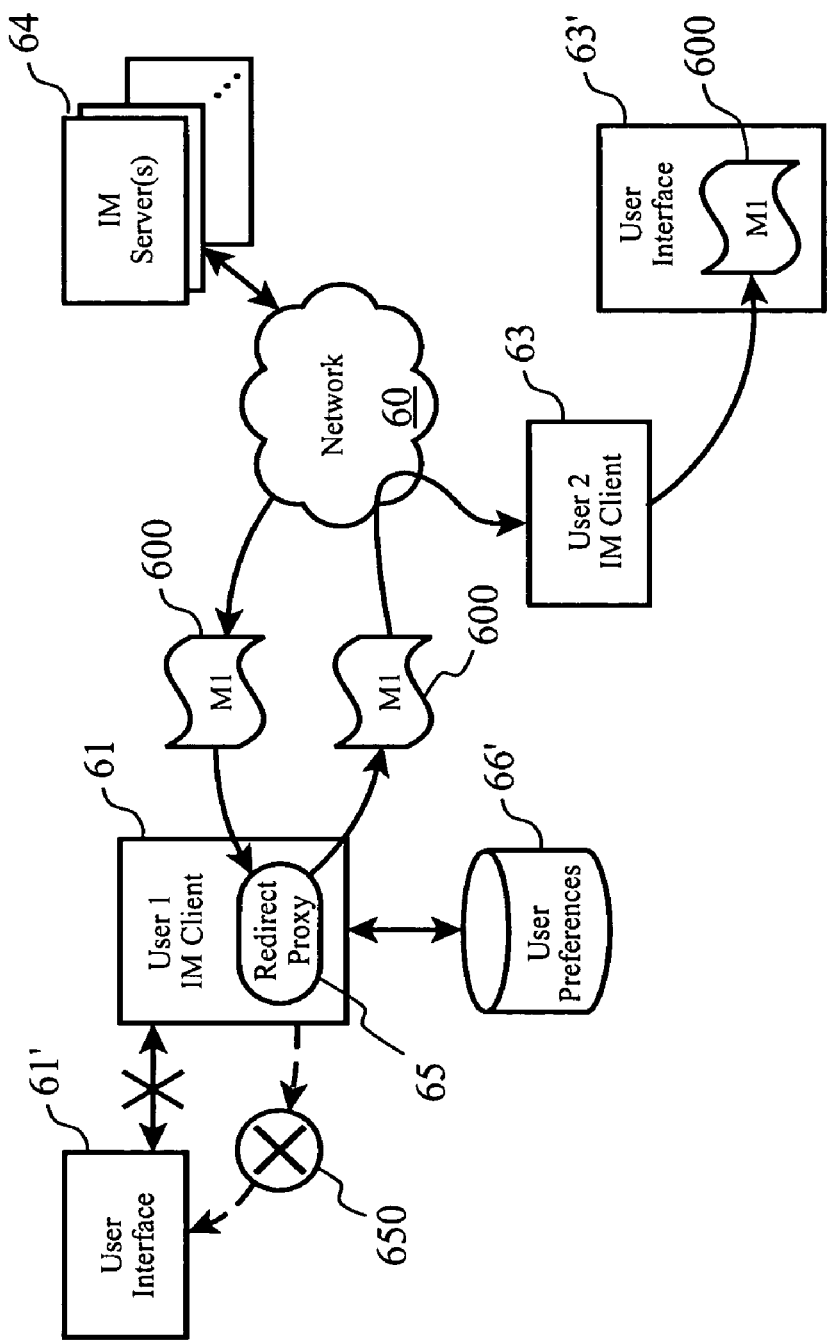
FIG. 6b illustrates a client-side alternative embodiment of the present invention.

Turning to FIG. 6b, a client-side alternative embodiment is shown, wherein the redirection proxy service (65) is provided to the originally intended recipient device (61). This allows specially enhanced client devices to work in legacy or "standard", unmodified IM systems, but to allow the user to enjoy the benefits of the present invention nonetheless. In this embodiment, when a message (600) is received from a sender, the user preferences (66') are checked to see if a proxy recipient should receive the message. If so, the message is automatically forwarded to the proxy recipient (63), and the action by the originally intended recipient device (61') to display or play (61') the message is suppressed. Redirected messages can be queued for later review by the client-side redirection proxy service (65) if desired, as well.

Enhanced Aspects of the Redirector

According to more advanced aspects of the present invention and with respect to the redirection proxy functionality, the following additional capabilities and processes are provided by the invention in alternate embodiments, either individually or in combinations and sub-combinations of each other:

(a) Prompting of Sender to Designate Alternate Recipient

Prior to presenting a newly received message to the intended party or the designated proxy party, the sender is prompted to designate an alternate destination party, such as using a prompt:

"<Intended Party's Name> is currently <in a meeting/presenting/on a telephone call/etc.> Would you like to have your message forwarded to the designated proxy, <proxy's name>?"

This aspect of the invention allows the sender instead of the intended recipient to distinguish personal messages from business related messages, content sensitive messages from those that could be handled by a proxy, or low-priority messages from urgent messages.

For example, the intended recipient may designate his or her secretary as the proxy, but the sender may realize the message is of a sensitive nature and shouldn't be viewed or handled by the secretary. So, responsive to the prompt, the sender may choose to cancel sending of the message, and alternatively may choose to send the message to another party (e.g. another manager-level person).

(b) Integration to LDAP

LDAP ("Lightweight Directory Access Protocol") is a well known protocol which allows restrictions to be placed on who can access certain areas of mass storage, and what those people (or devices) can do to those items (e.g. run applications, delete files, modify files, read-only, etc.).

Many corporations, including IBM, have established some level of personnel information, such as names, departments, manager's names, telephone numbers, email addresses, etc., in LDAP-compatible directories such that a wide array of LDAP-enabled applications can access the information (e.g. MS Outlook, Symantec ACT!, Palm Computing System's PDA-to-desktop synchronizers, etc.)

According to this optional aspect of the invention, a default assignee can be set up automatically on receiver's IM program to be a "back-up" recipient listed in an LDAP personnel directory or contact list, rather than or in addition to the feature of allowing the intended recipient to explicitly designate a diversion proxy user. For example, an LDAP personnel directory can be amended to include a field for each employee's entry to include a redirection proxy which is typically the employee's manager or secretary.

(c) Intuitive Status Message, Intelligence Response, and More Automated IM Interaction In this alternate embodiment of the present invention, the message sender is prompted to choose an alternate or proxy recipient to who the message should be redirected. For example, upon a sender attempting to contact "Benjamin Franklin", the prompt display may be as follows (using names from the signatures of the United States Declaration of Independence for illustration):

"Benjamin Franklin is currently unavailable. (1) Benjamin Rush is currently fielding his communications related to intellectual property. (2) Francis Lightfoot Lee is currently fielding his communications related to the Acme Corporation. (3) William Ellery is currently fielding his communications related to the 2005 budget status. Please click on one of the underlined names to redirect your message appropriately."

Upon selection of an option, the enhanced client or IM server software would send a copy of the message to the selected user, adding an annotation that is was redirect from transmission to the originally intended recipient.

(d) Automatic Redirection upon Response Timeout

According to this aspect of the invention, when the sender is aware that the intended recipient may be tied-up or otherwise unable to receive or respond to message, and assuming there is a proxy designee predefined by the receiver, a sender can simply type a special keyword recognized by the enhanced IM tool in the beginning of the chat message (alternatively in any part of the chat message), such as "<er>", which enables redirection to have the chat message redirected automatically.

To realize this aspect of the invention, each time a message is received for forwarding by an IM server, or received by the originally intended recipient, prior to displaying the message to the originally intended recipient, the text of the message is searched for the special keyword (e.g. <er> or <ER>), and if found, the message is not displayed to the originally intended recipient but is forwarded to the designated proxy user.

(e) Chat Trail

According to this aspect of the invention, the recipient of the IM messages can configure the chat program to keep a trail of messages and contacts using the following options to keep track of the redirected message and conversation:

1. Visible: Original receiver's chat window will continue to be opened and the redirected chat conversation will be the same as inviting all parties to join in a group chat, so the conversation is visible to everyone in the chat.
2. Hidden: Chat conversation between the redirected assignee and the sender will be stored on local repository (file, db, etc.) and can be opened for view at a later time.
3. Email: The system automatically sends an email when the conversation ends. The sender or redirected party may need to indicate end of conversation, or it can be when the meeting ends, or no responds from any party for a given time interval.

(f) Automatic Calendering Reply/Forward to Proxy

According to this aspect of the invention, the receiving user can enable a function to automatically respond to received messages with a pre-defined message (e.g. "John is presenting in Project ABC status meeting—current response time is estimated to be 45 minutes", and can extract any calendar requests (e.g. Outlook meeting request, etc.), access a calendar or scheduling application via an application programming interface, determine if a time or appointment slot is available, and respond affirmatively or negatively to the request.

Using this aspect, the invention allows commonplace IM messages which are simply trying to establish a meeting time to be fully and automatically handled without interrupting the user. The user could always cancel or reschedule the meeting later, if needed.

If the sender of such a message cannot wait 45 minutes for response, one of the aforementioned methods of proxy forwarding can be employed to reach the originally intended recipient's designated alternate.

(g) Recipient Session Overflow

If a sender sends a message to a recipient "Person-B", but PersonB is currently busy fielding questions for another redirection (e.g. the recipient is currently handling as many simultaneous threads of conversation as he or she wishes to handle), then the invention automatically returns a message to the sender, such as "Person-B is busy with another chat session (redirection) but has acknowledged your message, please wait a moment and your question will be answered."

Through integration of the invention with an IM topic feature, these types of status notifications can be created on-the-fly based on current user activities. For example, if Person-B is answering an IBM WebSphere security question, then the personal message can be updated to reflect that status, if desired by the originally intended recipient.

(h) Queuing of Missed and Redirected Messages

According to this aspect of the present invention, while a user is away or off-line, all contact messages directed to that user are stored in a temporary IM queue by the IM server so that the originally intended recipient can be notified of the messages (and forward actions) upon the recipient's logging into the IM system.

Optional aspects of this portion of the invention allow the originally intended recipient to see how many messages were queued and redirected, how many have been responded to by the designated proxy user(s), and to track further messages on the same subject matter between the sender and the designated proxy user.

Advanced IM Queue Management

According to another enhanced aspect of the present invention, IM servers, IM client devices, or both are provided message queues to hold missed or redirected messages as previously described, and certain additional logical processes are provided to allow management of the queued messages. The following queue management functions may be realized individually, in combination, or sub-combinations, either as client-side functions, server-side functions, or a combination of cooperating client and server functions. These functions provide the invention an ability to schedule calendar time for those IM sessions that were not answered by the recipient by:

(a) automatically scheduling traditional calendar events (meetings, appointments, reminders, tasks, etc.);
(b) automatically scheduling IM queue time to effectively guarantee that the sender's meeting or appointment request will not be queued during a specified (scheduled) time frame; or
(c) automatically coordinating messages having similar content or subject matter to be scheduled at the same time for a possible IM conference.

Additionally, functions are provided by the invention to reorder the queue of waiting IM messages based on a users current "context". This means queued IM messages are prioritized by their content, and not by a traditional FIFO or FILO time-based queuing method. In this queue management technique, the user is able to intelligently and automatically manage his IM messages based on his availability and the content of the incoming message. The automated actions described in the foregoing paragraphs can be performed anytime an IM message goes unanswered for specified period. If that condition occurs then the system will automatically schedule a future time according to the conditions (a), (b) or (c) in "Scheduling" as describe in the previous paragraphs. For example, an incoming queue of IM messages can be reordered according to message content, and then if the message is still unanswered, the system can perform the scheduling mechanisms for automatic scheduling of replies and redirection.

Queue Management Calendaring and Scheduling.

This aspect of the present invention provides an ability to schedule calendar time, such as for a meeting or appointment, for IM sessions which have been queued for a period of time based on predefined policies. When using a queuing system to limit the number of incoming instant messages, there exists a possibility that an instant message becomes a "distant" message and loses its "instant" or synchronous properties. In this situation, it becomes prudent to handle that message appropriately in some other non-instant manner.

One way to achieve this is to inform the sender that the receiver is not able to view the message, and have the system automatically schedule a time where that message can be addressed via an active instant messaging session. The present invention includes three optional manners in which this is done, as described in the following paragraphs.

Scheduling of Traditional Calendar Events.

For scheduling of traditional calendar events, such as meetings, appointments, reminders, tasks, one effective way to schedule queued messages exceeding a predetermined time frame, which may be referenced as "time to live" ("TTL"), is to automatically schedule time on the receiver's and sender's calendar using existing well known tools in the art. This entails creating a translator between the IM client and various supported email and personal information management ("PIM") clients, and then creating the calendar meeting invitation via existing API's or WebServices as appropriate. The content of the queued message is then copied to the meeting invitation via the "details" or "Notes" fields, and the subject of the generated message references the meeting as an IM conversation follow-up or something indicative of the same.

For scheduling IM queue time to effectively guarantee that a sender's request will not be queued during a specific scheduled time frame, a sender of a queued message exceeding a predetermined TTL is informed when the receiver will be able to communicate. This notification can optionally include an automated reply to the sender, preferably but not necessarily after the TTL has been reached, indicating a time frame in which the sender is guaranteed that the message in question will pass through the receiver's queue and be viewable.

In a preferred embodiment, the sender's IM client reminds the sender prior to, or upon arrival of, the set time so that he is made aware that the message will or has passed through the queue. This is preferably accomplished via a dialog box, or if the original instant message window was still opened, it is color coded or otherwise visually enhanced to indicate that the message is now active (or has passed through the queue).

Coordination of similar content or context can be scheduled at the same time for a possible IM conference, which uses context matching to determine the best time to schedule a calendar event using the methods discussed in the foregoing paragraphs. In this scenario, the system scans through the already-scheduled events on a user's calendar, determines, to the extent possible, the subject matter of each meeting, and also determines the subject matter of other pending or scheduled IM sessions. After this comparison, this function groups similar calendar events together so that messages with apparently related subject matter are either (a) scheduled in a back-to-back manner promoting improved communications coherency, (b) scheduled side-by-side, or combined, so that multiple parties could simultaneously discuss a common subject without the need for multiple calls or sessions related to a single topic of discussion.

Managing IM Queue Based on a User's Current Context.

Figure 4:
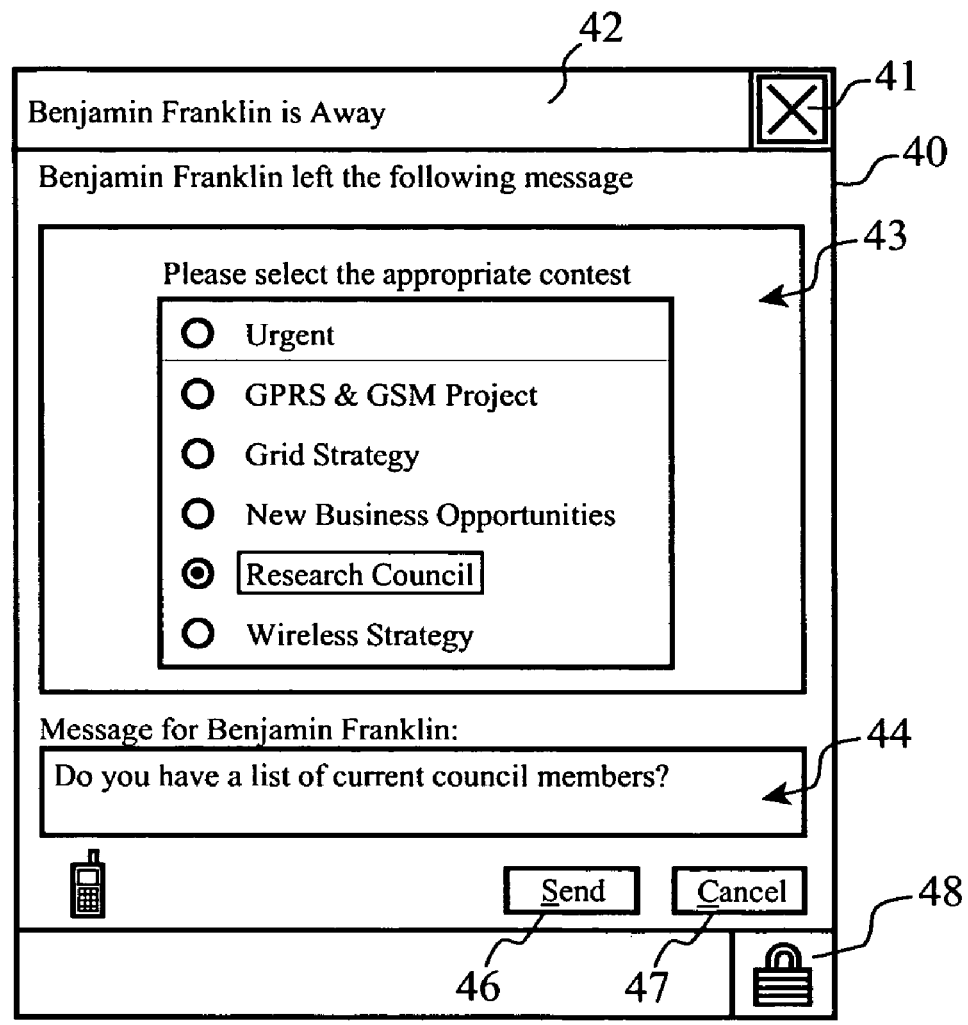
FIGS. 4, 5a and 5b illustrate the user interface and queue effects of operation of the present invention.
Figure 5A:
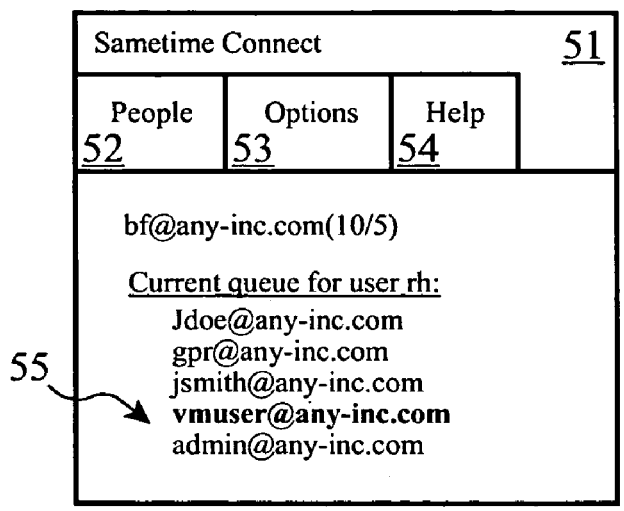
Figure 5B:
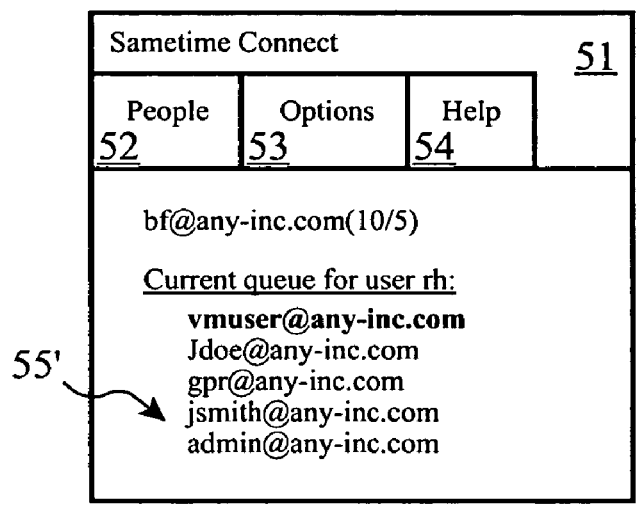

FIGS. 4, 5a and 5b, illustrate the user interface and queue effects of this enhanced operation of the present invention. Turning to FIG. 4, the sender or author of a message first matches an outgoing message with the intended recipient's context, message type or subject currently being accepted by the intended recipient, using a user interface mechanism such as a dialog box (40, 42) having a close button (41), a set of selectable context choices (43), an optional message input field (44), a secure mode indicator (48), and send (46) and cancel (47) buttons. Alternatively, the selectable context choices can be shown in a dialog box, pop-up menu, or drop-down list, separate from but related to the message authoring window or interface.

Having or being able to classify a context or subject matter for messages then allows the recipient's IM message queue to be reordered from a first-in-first-out order (55), as shown in FIG. 5a, to a context-relative or subject-matter-relative order (55'), as shown in FIG. 5b, wherein a queue summary window (51) can also include quick buttons to access a user list (52), set other options (53), and obtain help (54).

In the examples of FIGS. 5a and 5b, The recipient has a full queue which is shown initially (default) based on FIFO ordering. Based on subject matter or context, messages are moved ahead or back in the queue appropriately.

Turning to FIG. 1, a logical process according to the invention and as previously described is shown. First, a sending user establishes for a message one or more context values (1), and a new session is requested by the sender's IM client (2). If the intended recipient is queuing message (3), which can be communicated from the IM server to the sending IM client or from the intended recipient's IM client to the sending client, then a communication is made to see if the intended recipient has set a context value (4). If so, and if the sender has set context (5) that matches (6) the intended recipient's context, then the message is transmitted from the sender to the recipient, and it is moved ahead in the recipient's message queue accordingly. If context values on both ends are not set, or do not match, the message is transmitted but placed back or behind in the recipient's message queue (8). Optionally, a timer can be set (9) to allow for automatic disposition (e.g. redirection, automatic scheduling, etc.) (11) as previously described if the user does not handle the message within the allowed TTL value (10). The session can end (13) when the message has been automatically or manually handled.

Suitable Computing Platform

The invention is preferably realized as a feature or addition to the software already found present on well-known computing platforms such as personal computers, web servers, and web browsers. These common computing platforms can include personal computers as well as portable computing platforms, such as personal digital assistants ("PDA"), web-enabled wireless telephones, and other types of personal information management ("PIM") devices.

Therefore, it is useful to review a generalized architecture of a computing platform which may span the range of implementation, from a high-end web or enterprise server platform, to a personal computer, to a portable PDA or web-enabled wireless phone.

Figure 2A:
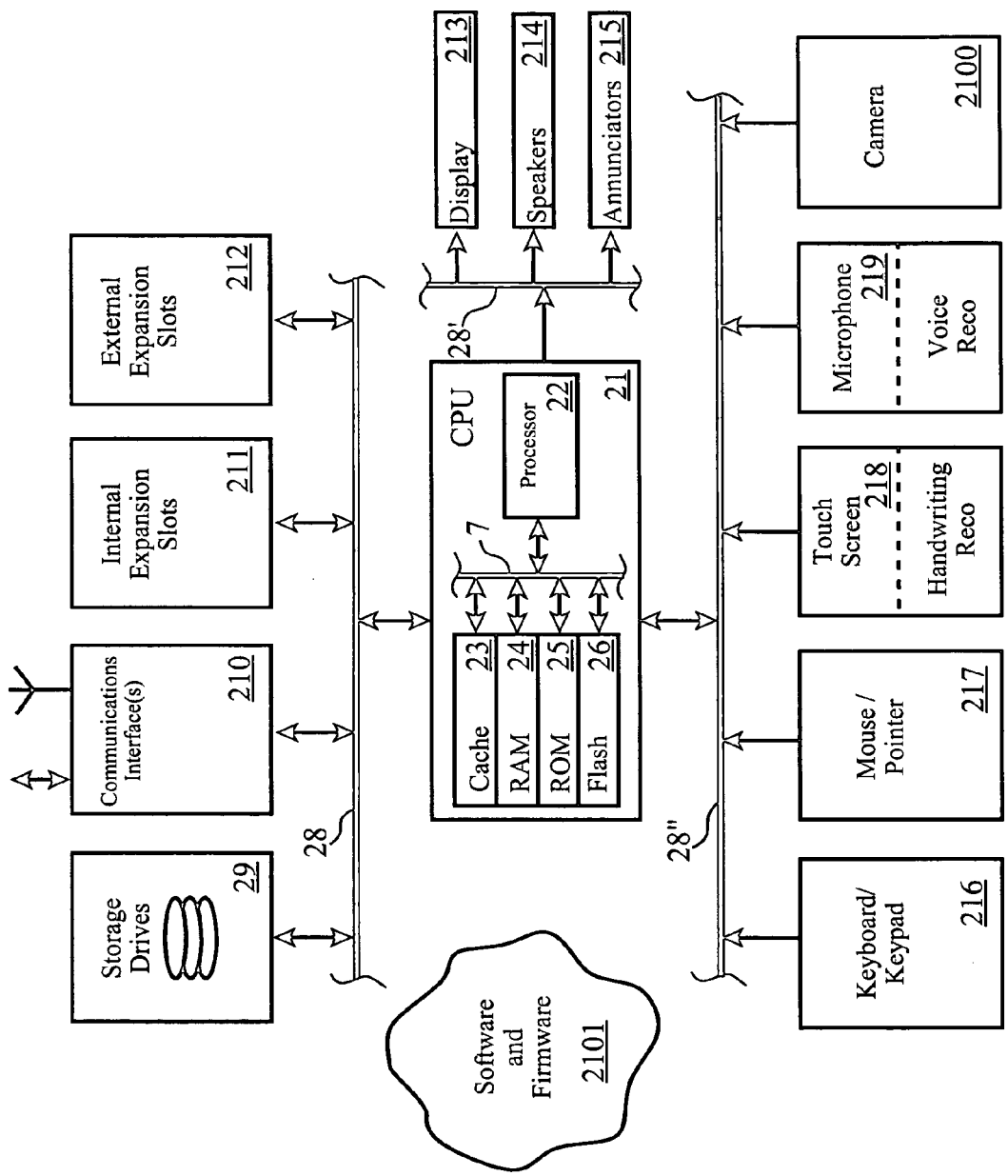
FIGS. 2a and 2b show a generalized computing platform architecture, and a generalized organization of software and firmware of such a computing platform architecture.

Turning to FIG. 2a, a generalized architecture is presented including a central processing unit (21) ("CPU"), which is typically comprised of a microprocessor (22) associated with random access memory ("RAM") (24) and read-only memory ("ROM") (25). Often, the CPU (21) is also provided with cache memory (23) and programmable FlashROM (26). The interface (27) between the microprocessor (22) and the various types of CPU memory is often referred to as a "local bus", but also may be a more generic or industry standard bus.

Many computing platforms are also provided with one or more storage drives (29), such as a hard-disk drives ("HDD"), floppy disk drives, compact disc drives (CD, CD-R, CD-RW, DVD, DVD-R, etc.), and proprietary disk and tape drives (e.g., Iomega Zip and Jaz, Addonics SuperDisk, etc.). Additionally, some storage drives may be accessible over a computer network.

Many computing platforms are provided with one or more communication interfaces (210), according to the function intended of the computing platform. For example, a personal computer is often provided with a high speed serial port (RS-232, RS-422, etc.), an enhanced parallel port ("EPP"), and one or more universal serial bus ("USB") ports. The computing platform may also be provided with a local area network "LAN") interface, such as an Ethernet card, and other high-speed interfaces such as the High Performance Serial Bus IEEE-1394.

Computing platforms such as wireless telephones and wireless networked PDA's may also be provided with a radio frequency ("RF") interface with antenna, as well. In some cases, the computing platform may be provided with an infrared data arrangement ("IrDA") interface, too.

Computing platforms are often equipped with one or more internal expansion slots (211), such as Industry Standard Architecture ("ISA"), Enhanced Industry Standard Architecture ("EISA"), Peripheral Component Interconnect ("PCI"), or proprietary interface slots for the addition of other hardware, such as sound cards, memory boards, and graphics accelerators.

Additionally, many units, such as laptop computers and PDA's, are provided with one or more external expansion slots (212) allowing the user the ability to easily install and remove hardware expansion devices, such as PCMCIA cards, SmartMedia cards, and various proprietary modules such as removable hard drives, CD drives, and floppy drives.

Often, the storage drives (29), communication interfaces (210), internal expansion slots (211) and external expansion slots (212) are interconnected with the CPU (21) via a standard or industry open bus architecture (28), such as ISA, EISA, or PCI. In many cases, the bus (28) may be of a proprietary design.

A computing platform is usually provided with one or more user input devices, such as a keyboard or a keypad (216), and mouse or pointer device (217), and/or a touch-screen display (218). In the case of a personal computer, a full size keyboard is often provided along with a mouse or pointer device, such as a track ball or TrackPoint. In the case of a web-enabled wireless telephone, a simple keypad may be provided with one or more function-specific keys. In the case of a PDA, a touch-screen (218) is usually provided, often with handwriting recognition capabilities.

Additionally, a microphone (219), such as the microphone of a web-enabled wireless telephone or the microphone of a personal computer, is supplied with the computing platform. This microphone may be used for simply reporting audio and voice signals, and it may also be used for entering user choices, such as voice navigation of web sites or auto-dialing telephone numbers, using voice recognition capabilities.

Many computing platforms are also equipped with a camera device (2100), such as a still digital camera or full motion video digital camera.

One or more user output devices, such as a display (213), are also provided with most computing platforms. The display (213) may take many forms, including a Cathode Ray Tube ("CRT"), a Thin Flat Transistor ("TFT") array, or a simple set of light emitting diodes ("LED") or liquid crystal display ("LCD") indicators.

One or more speakers (214) and/or annunciators (215) are often associated with computing platforms, too. The speakers (214) may be used to reproduce audio and music, such as the speaker of a wireless telephone or the speakers of a personal computer. Annunciators (215) may take the form of simple beep emitters or buzzers, commonly found on certain devices such as PDAs and PIMs.

These user input and output devices may be directly interconnected (28', 28") to the CPU (21) via a proprietary bus structure and/or interfaces, or they may be interconnected through one or more industry open buses such as ISA, EISA, PCI, etc.

The computing platform is also provided with one or more software and firmware (2101) programs to implement the desired functionality of the computing platforms.

Figure 2B:
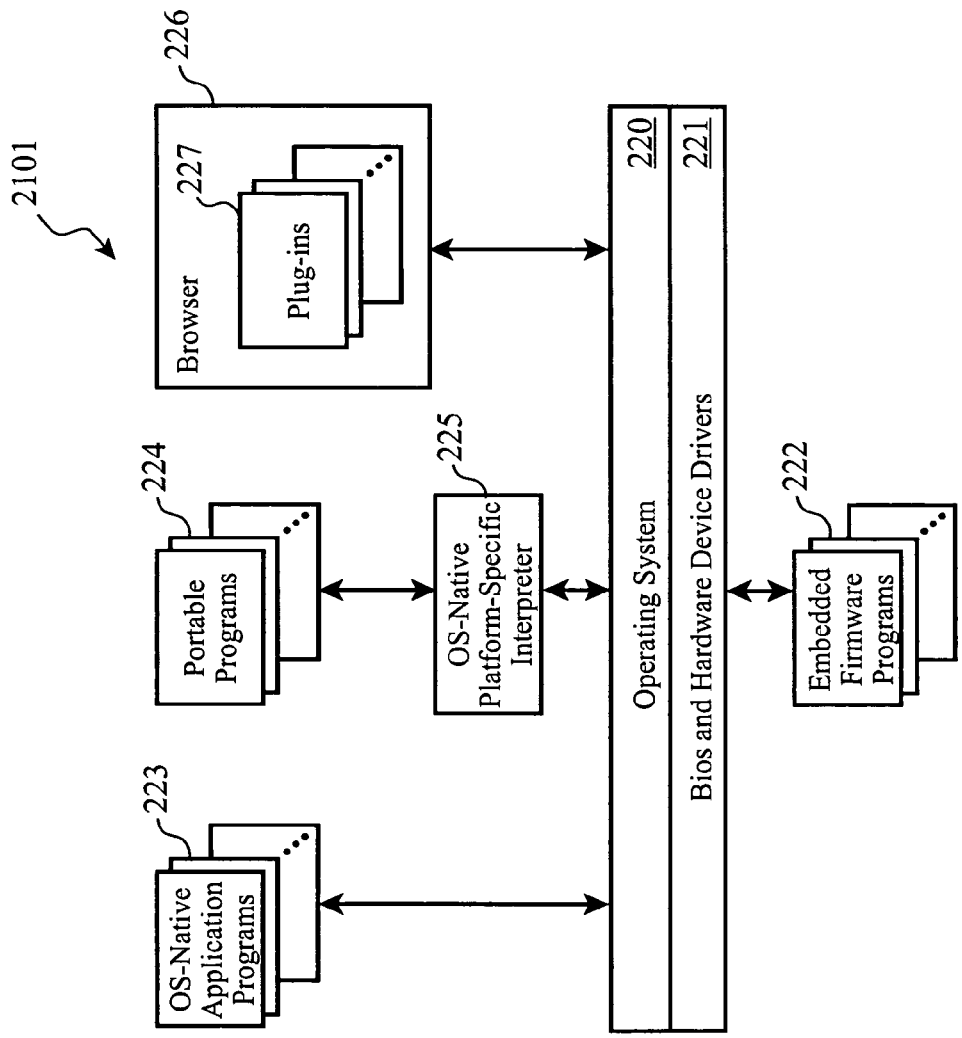

Turning to now FIG. 2b, more detail is given of a generalized organization of software and firmware (2101) on this range of computing platforms. One or more operating system ("OS") native application programs (223) may be provided on the computing platform, such as word processors, spreadsheets, contact management utilities, address book, calendar, email client, presentation, financial and bookkeeping programs.

Additionally, one or more "portable" or device-independent programs (224) may be provided, which must be interpreted by an OS-native platform-specific interpreter (225), such as Java scripts and programs.

Often, computing platforms are also provided with a form of web browser or micro-browser (226), which may also include one or more extensions to the browser such as browser plug-ins (227).

The computing device is often provided with an operating system (220), such as Microsoft Windows, UNIX, IBM OS/2, IBM AIX, open source LINUX, Apple's MAC OS, or other platform specific operating systems. Smaller devices such as PDA's and wireless telephones may be equipped with other forms of operating systems such as real-time operating systems ("RTOS") or Palm Computing's PalmOS.

A set of basic input and output functions ("BIOS") and hardware device drivers (221) are often provided to allow the operating system (220) and programs to interface to and control the specific hardware functions provided with the computing platform.

Additionally, one or more embedded firmware programs (222) are commonly provided with many computing platforms, which are executed by onboard or "embedded" microprocessors as part of the peripheral device, such as a micro controller or a hard drive, a communication processor, network interface card, or sound or graphics card.

As such, FIGS. 2a and 2b describe in a general sense the various hardware components, software and firmware programs of a wide variety of computing platforms, including but not limited to personal computers, PDAs, PIMs, web-enabled telephones, and other appliances such as WebTV units. As such, we now turn our attention to disclosure of the present invention relative to the processes and methods preferably implemented as software and firmware on such a computing platform. It will be readily recognized by those skilled in the art that the following methods and processes may be alternatively realized as hardware functions, in part or in whole, without departing from the spirit and scope of the invention.

Software Deployment

According to one embodiment of the invention, the methods and processes of the invention are distributed or deployed as a service to by a service provider to a client's computing system(s).

Figure 3A:
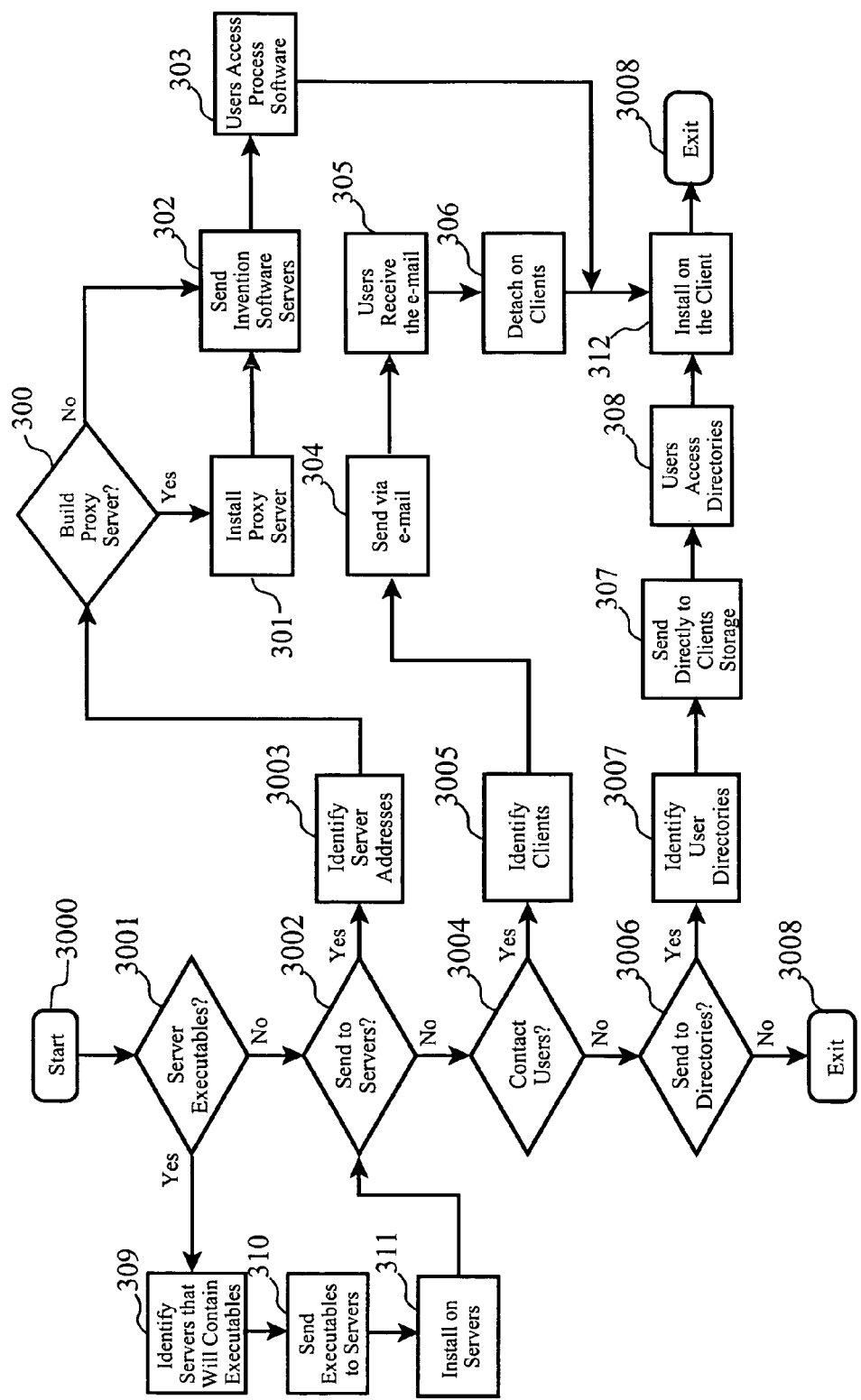
FIG. 3a sets for a logical process to deploy software to a client in which the deployed software embodies the methods and processes of the present invention.

Turning to FIG. 3a, the deployment process begins (3000) by determining (3001) if there are any programs that will reside on a server or servers when the process software is executed. If this is the case then the servers that will contain the executables are identified (309). The process software for the server or servers is transferred directly to the servers storage via FTP or some other protocol or by copying through the use of a shared files system (310). The process software is then installed on the servers (311).

Next a determination is made on whether the process software is to be deployed by having users access the process software on a server or servers (3002). If the users are to access the process software on servers then the server addresses that will store the process software are identified (3003).

In step (3004) a determination is made whether the process software is to be developed by sending the process software to users via e-mail. The set of users where the process software will be deployed are identified together with the addresses of the user client computers (3005). The process software is sent via e-mail to each of the user's client computers. The users then receive the e-mail (305) and then detach the process software from the e-mail to a directory on their client computers (306). The user executes the program that installs the process software on his client computer (312) then exits the process (3008).

A determination is made if a proxy server is to be built (300) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required then the proxy server is installed (301). The process software is sent to the servers either via a protocol such as FTP or it s copied directly from the source files to the server files via file sharing (302). Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems (303). Another embodiment is to have the servers automatically copy the process software to each client and then run the installation program for the process software at each client computer. The user executes the program that installs the process software on his client computer (312) then exits the process (3008).

Lastly, a determination is made on whether the process software will be sent directly to user directories on their client computers (3006). If so, the user directories are identified (3007). The process software is transferred directly to the user's client computer directory (307). This can be done in several ways such as but not limited to sharing of the file system directories and then copying from the sender's file system to the recipient user's file system or alternatively using a transfer protocol such as File Transfer Protocol ("FTP"). The users access the directories on their client file systems in preparation for installing the process software (308). The user executes the program that installs the process software on his client computer (312) then exits the process (3008).

Software Integration

According to another embodiment of the present invention, software embodying the methods and processes disclosed herein are integrated as a service by a service provider to other software applications, applets, or computing systems.

Integration of the invention generally includes providing for the process software to coexist with applications, operating systems and network operating systems software and then installing the process software on the clients and servers in the environment where the process software will function.

Generally speaking, the first task is to identify any software on the clients and servers including the network operating system where the process software will be deployed that are required by the process software or that work in conjunction with the process software. This includes the network operating system that is software that enhances a basic operating system by adding networking features. Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 3B:
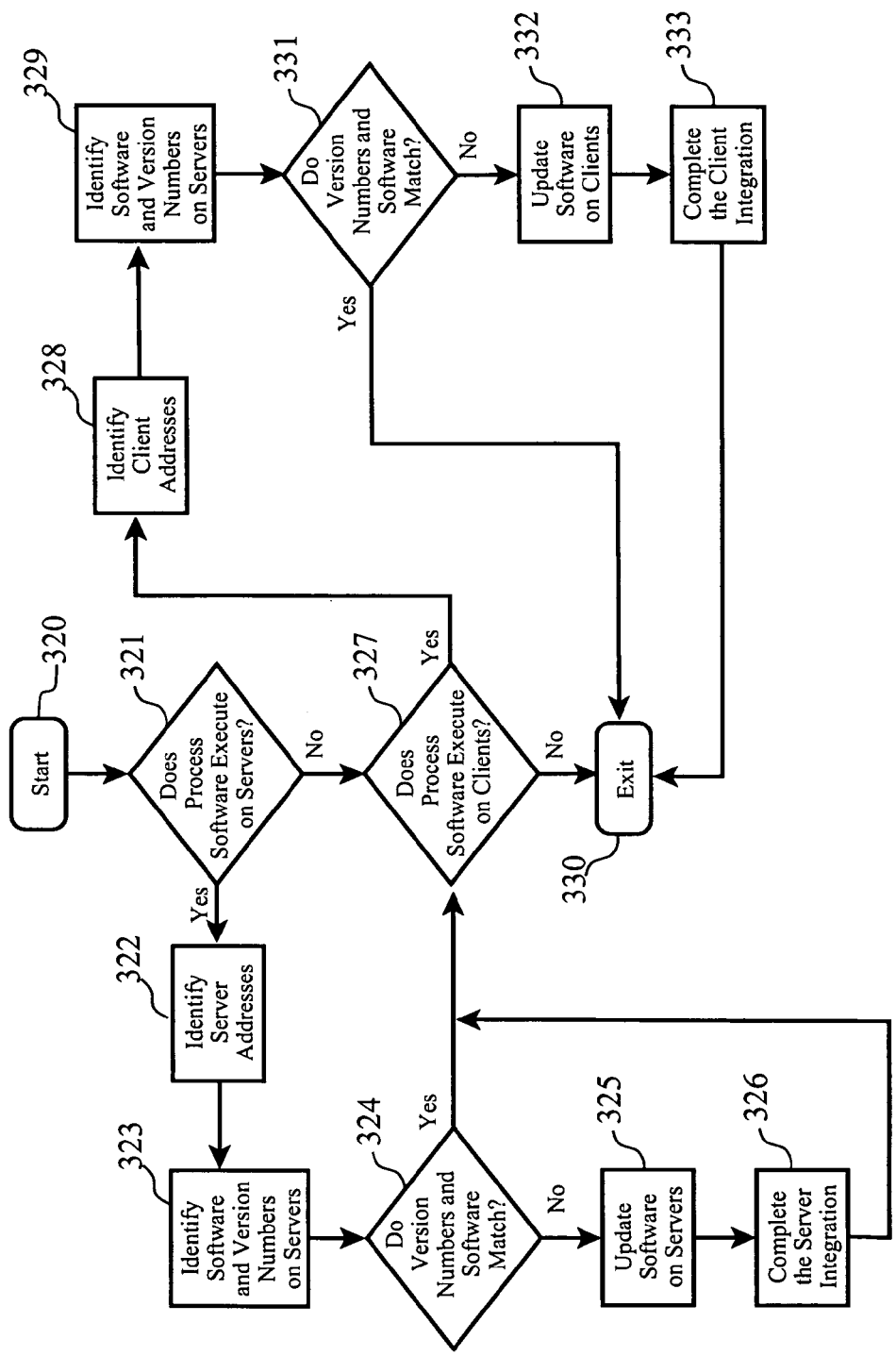
FIG. 3b sets for a logical process to integrate software to other software programs in which the integrated software embodies the methods and processes of the present invention.

Turning to FIG. 3b, details of the integration process according to the invention are shown. Integrating begins (320) by determining if there are any process software programs that will execute on a server or servers (321). If this is not the case, then integration proceeds to (327). If this is the case, then the server addresses are identified (322). The servers are checked to see if they contain software that includes the operating system ("OS"), applications, and network operating systems ("NOS"), together with their version numbers, that have been tested with the process software (323). The servers are also checked to determine if there is any missing software that is required by the process software (323).

A determination is made if the version numbers match the version numbers of OS, applications and NOS that have been tested with the process software (324). If all of the versions match and there is no missing required software the integration continues in (327).

If one or more of the version numbers do not match, then the unmatched versions are updated on the server or servers with the correct versions (325). Additionally if there is missing required software, then it is updated on the server or servers (325). The server integration is completed by installing the process software (326).

Step (327) which follows either (321), (324), or (326) determines if there are any programs of the process software that will execute on the clients. If no process software programs execute on the clients the integration proceeds to (330) and exits. If this is not the case, then the client addresses are identified (328).

The clients are checked to see if they contain software that includes the operating system ("OS"), applications, and network operating systems ("NOS"), together with their version numbers, that have been tested with the process software (329). The clients are also checked to determine if there is any missing software that is required by the process software (329).

A determination is made if the version numbers match the version numbers of OS, applications and NOS that have been tested with the process software 331. If all of the versions match and there is no missing required software, then the integration proceeds to (330) and exits.

If one or more of the version numbers do not match, then the unmatched versions are updated on the clients with the correct versions (332). In addition, if there is missing required software then it is updated on the clients (332). The client integration is completed by installing the process software on the clients (333). The integration proceeds to (330) and exits.

On-Demand Computing Services

According to another aspect of the present invention, the processes and methods disclosed herein are provided through an on-demand computing architecture to render service to a client by a service provider.

Figure 3C:
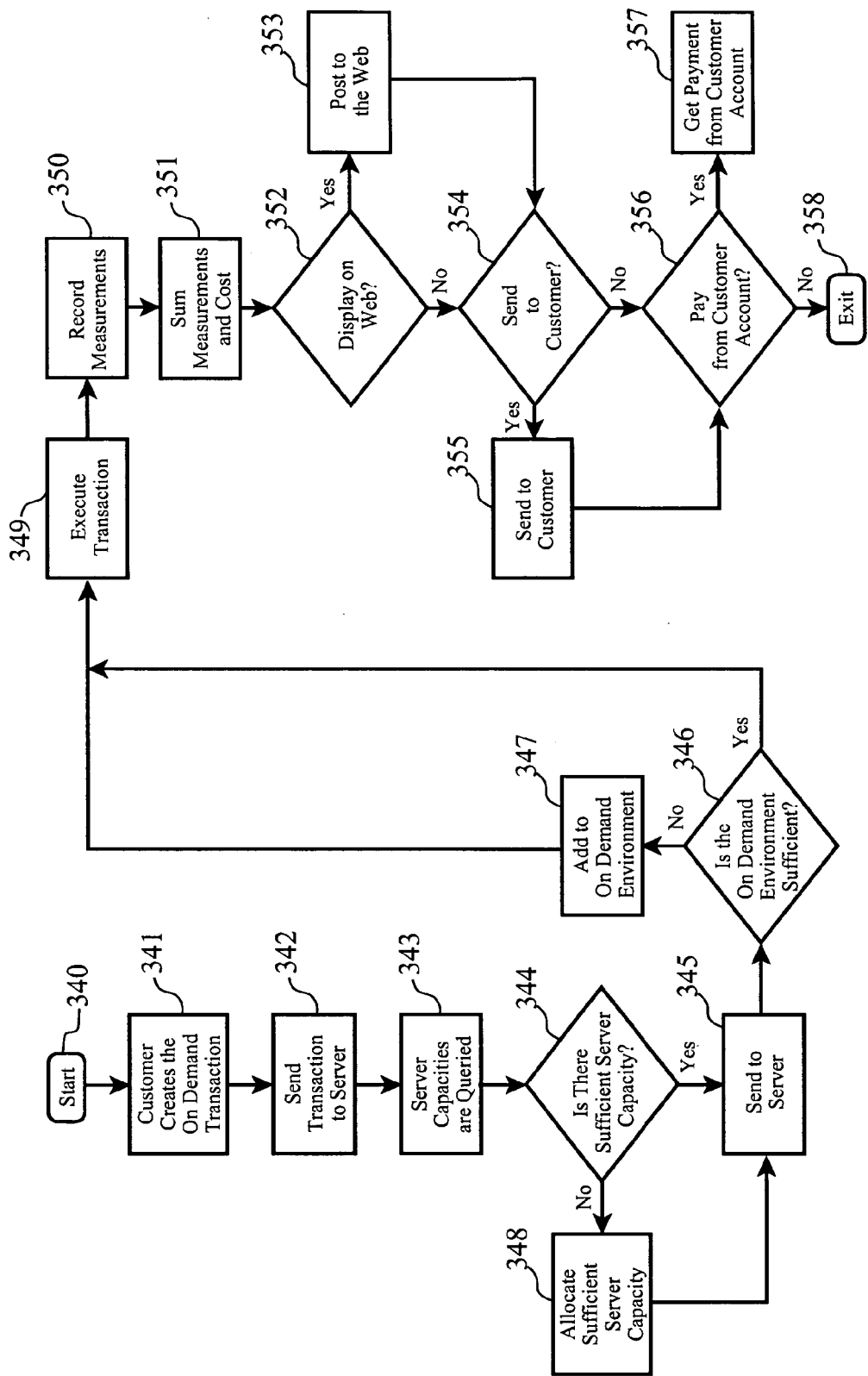
FIG. 3c sets for a logical process to execute software on behalf of a client in an on-demand computing system, in which the executed software embodies the methods and processes of the present invention.

Turning to FIG. 3c, generally speaking, the process software embodying the methods disclosed herein is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions, etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to effect the performance of that server, other servers are accessed to increase the capacity and to share the workload. Likewise when other measurements of use such as network bandwidth, memory usage, storage usage, etc. approach a capacity so as to effect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the computer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

FIG. 3c sets forth a detailed logical process which makes the present invention available to a client through an On-Demand process. A transaction is created that contains the unique customer identification, the requested service type and any service parameters that further specify the type of service (341). The transaction is then sent to the main server (342). In an On Demand environment the main server can initially be the only server, then as capacity is consume other servers are added to the On Demand environment.

The server central processing unit ("CPU") capacities in the On Demand environment are queried (343). The CPU requirement of the transaction is estimated, then the servers available CPU capacity in the On Demand environment are compared to the transaction CPU requirement to see if there is sufficient CPU available capacity in any server to process the transaction (344). If there is not sufficient server CPU available capacity, then additional server CPU capacity is allocated to process the transaction (348). If there was already sufficient available CPU capacity then the transaction is sent to a selected server (345).

Before executing the transaction, a check is made of the remaining On Demand environment to determine if the environment has sufficient available capacity for processing the transaction. This environment capacity consists of such things as but not limited to network bandwidth, processor memory, storage etc. (345). If there is not sufficient available capacity, then capacity will be added to the On Demand environment (347). Next the required software to process the transaction is accessed, loaded into memory, then the transaction is executed (349).

The usage measurements are recorded (350). The usage measurements consists of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (351).

If the customer has requested that the On Demand costs be posted to a web site (352) then they are posted (353). If the customer has requested that the On Demand costs be sent via e-mail to a customer address (354) then they are sent (355). If the customer has requested that the On Demand costs be paid directly from a customer account (356) then payment is received directly from the customer account (357). The last step is to exit the On Demand process.

VPN Deployment

According to another aspect of the present invention, the methods and processes described herein may be embodied in part or in entirety in software which can be deployed to third parties as part of a service, wherein a third party VPN service is offered as a secure deployment vehicle or wherein a VPN is build on-demand as required for a specific deployment.

A virtual private network ("VPN") is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider ("ESP") sets a network access server ("NAS") and provides the remote users with desktop client software for their computers. The telecommuters can then dial a toll-free number to attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a companies multiple fixed sites over a public network such as the Internet.

The process software is transported over the VPN via tunneling which is the process of placing an entire packet within another packet and sending it over the network. The protocol of the outer packet is understood by the network and both points, called tunnel interfaces, where the packet enters and exits the network.

Figure 3D:
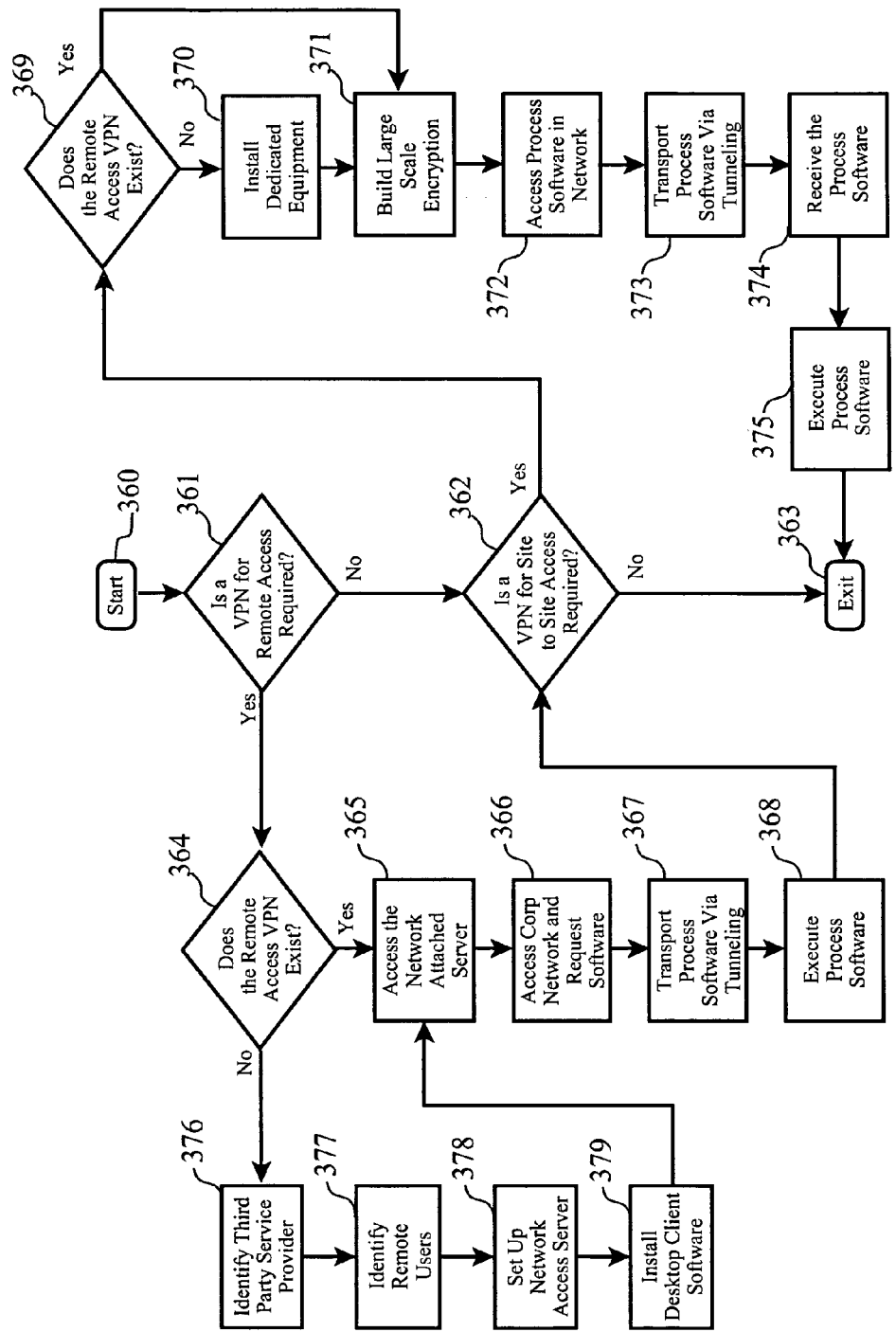
FIG. 3d sets for a logical process to deploy software to a client via a virtual private network, in which the deployed software embodies the methods and processes of the present invention.

Turning to FIG. 3d, VPN deployment process starts (360) by determining if a VPN for remote access is required (361). If it is not required, then proceed to (362). If it is required, then determine if the remote access VPN exits (364).

If a VPN does exist, then the VPN deployment process proceeds (365) to identify a third party provider that will provide the secure, encrypted connections between the company's private network and the company's remote users (376). The company's remote users are identified (377). The third party provider then sets up a network access server ("NAS") (378) that allows the remote users to dial a toll free number or attach directly via a broadband modem to access, download and install the desktop client software for the remote-access VPN (379).

After the remote access VPN has been built or if it has been previously installed, the remote users can access the process software by dialing into the NAS or attaching directly via a cable or DSL modem into the NAS (365). This allows entry into the corporate network where the process software is accessed (366). The process software is transported to the remote user's desktop over the network via tunneling. That is the process software is divided into packets and each packet including the data and protocol is placed within another packet (367). When the process software arrives at the remote user's desktop, it is removed from the packets, reconstituted and then is executed on the remote users desktop (368).

A determination is made to see if a VPN for site to site access is required (362). If it is not required, then proceed to exit the process (363). Otherwise, determine if the site to site VPN exists (369). If it does exist, then proceed to (372). Otherwise, install the dedicated equipment required to establish a site to site VPN (370). Then build the large scale encryption into the VPN (371).

After the site to site VPN has been built or if it had been previously established, the users access the process software via the VPN (372). The process software is transported to the site users over the network via tunneling. That is the process software is divided into packets and each packet including the data and protocol is placed within another packet (374). When the process software arrives at the remote user's desktop, it is removed from the packets, reconstituted and is executed on the site users desktop (375). Proceed to exit the process (363).

CONCLUSION

The present invention has been described, and several example embodiments have been provided to illustrate the invention. It will be recognized by those skilled in the art that certain variations and alternate embodiments may be realized, differing from these example embodiments, but still within the spirit and scope of the present invention. Therefore, the scope of the invention should be determined by the following claims.

What is claimed is:

1. A method for conducting a transaction in an on-demand computing environment comprising:
   providing transaction-oriented process software in a shared file system configured:
   to provide one or more designations of proxy recipients related to an original recipient,
   to provide one or more redirection rules indicating conditions under which said designated proxy recipients are to be sent redirected instant messages, said redirection rules containing at least one rule besides a rule to forward all instant messages,
   to receive an instant message directed towards said original recipient from a sender,
   to evaluate said redirection rules,
   to send said received instant message to a designated proxy recipient according to said redirection rules, and
   to suppress instant delivery of said received instant message to a user interface associated with said original recipient;
   executing said transaction-oriented process software in an on-demand computing system wherein transactions provided by said transaction-oriented process software are automatically shared by serving plurality customers;
   differentiating and recording usage for each of the plurality of customers of said transaction-oriented process software according to one or more parameters included in said transactions, said parameters uniquely identifying each customer and a type of transaction conducted for that customer;
   providing transaction processing capacity to said customers using a pay-as-you-go billing process in which charges are posted for actual computing resource consumption, said pay-as-you go model metering resource consumption by units of consumption including processor units of time, number of processor operations, number of transactions completed, network bandwidth utilized, memory usage, storage usage, and number of communications packet transfers completed, wherein said pay-as-you-go billing process further comprises:
   collecting by a billing server from a transaction server service consumption measurements for said customers,
   periodically summing said collected measurements for each of said customers,
   multiplying said summed measurements by a unit cost factor to determine a total service cost for each said customer, and
   posting said total service costs to at least one banking account server payment; and
   responsive to a number of transactions to any one server exceeding a measured aggregate capacity limit including a maximum network bandwidth, a maximum memory usage, and a maximum storage usage, automatically accessing one or more additional servers to increase the capacity and to share the workload.

* * * * *